United States Patent
Ahn et al.

(10) Patent No.: US 8,373,964 B2
(45) Date of Patent: Feb. 12, 2013

(54) MULTI-LAYERED CERAMIC CAPACITOR

(75) Inventors: Young Ghyu Ahn, Gyunggi-do (KR); Dong Seok Park, Seoul (KR); Sang Soo Park, Gyunggi-do (KR); Min Cheol Park, Gyunggi-do (KR); Byoung Hwa Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/064,153

(22) Filed: Mar. 8, 2011

(65) Prior Publication Data

US 2011/0317327 A1    Dec. 29, 2011

(30) Foreign Application Priority Data

Jun. 24, 2010   (KR) .................. 10-2010-0060148

(51) Int. Cl.
*H01G 4/30* (2006.01)
*H01G 4/06* (2006.01)
*H01G 4/228* (2006.01)
*H01G 4/005* (2006.01)

(52) U.S. Cl. ............... 361/301.4; 361/321.2; 361/306.3; 361/303

(58) Field of Classification Search ................. 361/303, 361/306.3, 321.2, 321.3, 301.4
See application file for complete search history.

(56) References Cited

U.S. PATENT DOCUMENTS

| 4,556,929 | A * | 12/1985 | Tanaka et al. ............ 361/321.2 |
| 7,239,500 | B2  | 7/2007  | Togashi et al. |
| 2008/0204969 | A1 | 8/2008 | Takashima et al. |

FOREIGN PATENT DOCUMENTS

| JP | 52-105056 | 8/1977 |
| JP | 6-84690 | 3/1994 |
| JP | 11-297566 | 10/1999 |
| KR | 10-2005-0096454 A | 10/2005 |
| KR | 10-2008-0064980 | 7/2008 |

OTHER PUBLICATIONS

Korean Office Action issued Jul. 1, 2011 in corresponding Korean Patent Application 10-2010-0060148.
Japanese Office Action for Application No. 2011-050213 issued Aug. 17, 2012.

* cited by examiner

*Primary Examiner* — Eric Thomas
*Assistant Examiner* — Arun Ramaswamy

(57) ABSTRACT

There is provided a multi-layered ceramic capacitor with reduced internal resistance by forming internal electrode groups including internal electrodes having different lengths. The multi-layered ceramic capacitor of the present invention includes a sintered ceramic body part in which cover layers are provided on both surfaces thereof as an outermost layer and a plurality of ceramic layers are stacked therebetween, first and second external electrodes each formed on an outer surface of the sintered ceramic body part, a plurality of first and second internal electrode groups adjacent to each other in a stacking direction of the plurality of ceramic layers, having the ceramic layer therebetween, and including 2N or 2N+1 (N is an integer number larger than 1) internal electrodes electrically connected to the first and second external electrodes, wherein the 2N or 2N+1 (N is an integer number larger than 1) internal electrodes are disposed to face at least one internal electrode of other adjacent internal electrode groups. A length of each internal electrode has a pyramid shape.

7 Claims, 4 Drawing Sheets

MULTI-LAYERED CERAMIC CAPACITOR

CROSS-REFERENCE TO RELATED APPLICATIONS

This application claims the priority of Korean Patent Application No. 10-2010-0060148 filed on Jun. 24, 2010, in the Korean Intellectual Property Office, the disclosure of which is incorporated herein by reference.

BACKGROUND OF THE INVENTION

1. Field of the Invention

The present invention relates to a multi-layered ceramic capacitor, and in particular, to a multi-layered ceramic capacitor capable of reducing resistance loss by controlling a length of each internal electrode layer to form capacitance.

2. Description of the Related Art

Recently, demand for a micro multi-layered ceramic capacitor has been increased with the miniaturization of electronic devices. A multi-layered ceramic capacitor having small loss characteristics has mainly been used for impedance matching, DC signal interception, and the like, in order to reduce signal loss in devices such as an amplification circuit of a base station of a mobile communications system.

An ideal capacitor has no loss, however, in actuality, a capacitor has both dielectric loss and resistance loss, wherein the magnitude of the loss may be represented by a quality factor (hereinafter, referred to as 'Q'). In the case that the amount of loss is small, the Q value is large.

$$Q = 1/(2\pi f \cdot C \cdot ESR)$$

Where f represents a frequency, C represents the capacitance of a capacitor, and ESR represents the equivalent series resistance of a capacitor. Therefore, in order to manufacture the multi-layered ceramic capacitor having a high Q value, the loss of a dielectric material should be small, within a frequency region of several hundred MHz or less, while the resistance loss of the internal electrode should be mainly improved within a frequency region exceeding several hundred MHz.

SUMMARY OF THE INVENTION

An aspect of the present invention provides a multi-layered ceramic capacitor capable of improving the resistance loss of an internal electrode by controlling the length of an internal electrode of a multi-layered ceramic capacitor.

According to an aspect of the present invention, there is provided a multi-layered ceramic capacitor, including: a sintered ceramic body part in which cover layers are provided on both surfaces thereof as an outermost layer and a plurality of ceramic layers are stacked therebetween; first and second external electrodes each formed on an outer surface of the sintered ceramic body part; a plurality of first and second internal electrode groups adjacent to each other in a stacking direction of the plurality of ceramic layers, having the ceramic layer therebetween, and including 2N or 2N+1 (N is an integer number larger than 1) internal electrodes electrically connected to the first and second external electrodes, wherein in the same internal electrode group, the internal electrodes in the outside direction have a length shorter than the adjacent internal electrodes in the central direction.

The 2N or 2N+1 (N is an integer number larger than 1) internal electrodes are disposed to face at least one internal electrode of other adjacent internal electrode groups, and when a length of an n-th internal electrode is Ln in the internal electrode, the following Equation 1 is met.

$L1 < L2 < \ldots < LN = LN+1 > LN+2 > \ldots > L2N$ (a case of $2N$)

$L1 < L2 < \ldots < LN+1 > LN+2 > \ldots > L2N+1$ (a case of $2N+1$)     Equation 1

Preferably, the following Equation 2 is met:

$|Ln - Ln+1| = d$ is constant (however, except in the case of $LN = LN+1$)     Equation 2

The internal electrodes of the internal electrode group having M (2N or 2N+1) internal electrodes meet the following Equation 3.

$L1 = LM, L2 = LM-1, L3 = LM-2$     Equation 3

When M opposing areas are provided between the mutually facing internal electrodes of the mutually facing internal electrode groups, the following $S_m$ is not 0 if an m-th ($1 \geq m \geq M$) facing area is $S_m$.

When M opposing areas are provided between the mutually facing internal electrodes of the mutually facing internal electrode groups, the following Equation 4 is met if an m-th ($1 \geq m \geq M$) facing area is $S_m$.

$S_1 = \ldots = S_m = \ldots = S_M$     Equation 4

The widths of the internal electrodes in the internal electrode group are different from each other.

An ESR value is controlled by controlling the N value.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
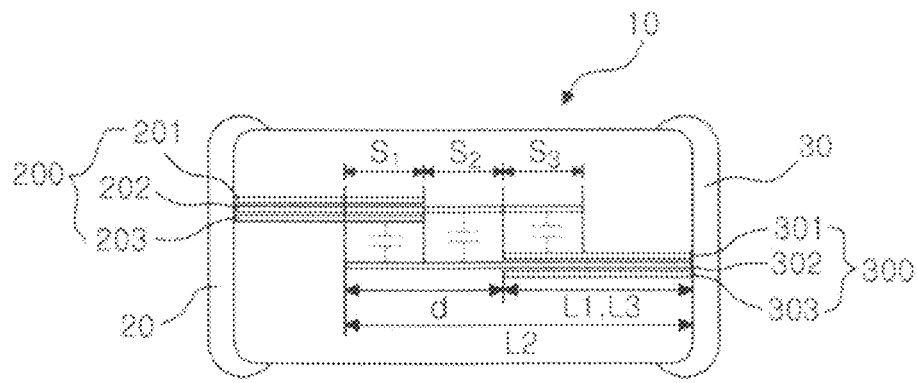
FIG. 1 is a cross-sectional view of a multi-layered ceramic capacitor according to an embodiment of the present invention.

FIG. 1 is a cross-sectional view of a multi-layered ceramic capacitor according to an embodiment of the present invention.

Referring to FIG. 1, a multi-layered capacitor 10 according to an exemplary embodiment of the present invention includes a capacitor body formed by stacking a plurality of dielectric layers. First and second electrode groups 200 and 300 are formed on each of the dielectric layers and the first and second internal electrode groups 200 and 300 are disposed to be opposite to each other, having a dielectric layer therebetween, such that they are connected to first and second external electrodes 20 and 30, respectively, formed at both ends of the capacitor body.

Generally, the first and second external electrodes 20 and 30 are manufactured in a manner of dipping both sides of the capacitor body in a metal paste, such that they may be formed to be extended to a part of other adjacent surfaces. When the region extending to the upper and lower surfaces of the capacitor body among the external electrodes is embedded in a printed circuit board, it is provided as regions that may be connected to a conductive via hole or a conductive line.

According to an exemplary embodiment of the present invention, the multi-layered capacitor 10 includes an element in which dielectric layers are stacked, the first external electrode formed on the outer surface of the element, and the second electrode electrically insulated from the first electrode. The capacitor 10 may include a plurality of internal electrode groups each including 2N or 2N+1 (N is an integer number larger than 1) internal electrodes that are electrically connected to the first external electrode. In addition, the capacitor 10 may include a plurality of internal electrode groups each including 2N or 2N+1 (N is an integer number larger than 2) internal electrodes that are electrically connected to the second external electrode.

Each internal electrode group may include the same number of internal electrodes and the number of internal electrodes included in the internal electrode groups may be represented by a natural number of 2 or more.

In the same internal electrode groups, the internal electrodes existing in the external direction have a shorter length than that of the adjacent internal electrode existing in a central direction thereto.

The plurality of internal electrode groups electrically connected to the first external electrode are disposed to mutually intersect with the plurality of internal electrode groups electrically connected to the second external electrode. Each internal electrode is disposed to have an opposing area P facing the internal electrode of the adjacent internal electrode group.

In addition, each internal electrode in the internal electrode group does not have the same length and width at all times and therefore, may have different lengths and widths.

Further, in the internal electrode, when the length of an n-th internal electrode is Ln, the multi-layered ceramic capacitor meets the following Equation 1.

$$L1<L2<\ldots<LN=LN+1>LN+2>\ldots>L2N \text{ (case of } 2N\text{)}$$

$$L1<L2<\ldots<LN+1>LN+2>\ldots>L2N+1 \text{ (case of } 2N+1\text{)} \qquad \text{Equation 1}$$

That is, the length of the n-th internal electrode of the internal electrode group having N internal electrodes is increased as it approaches an intermediate value and it is reduced as it approaches a first and final value. That is, the length of the internal electrode is gradually increased and is again reduced after it reaches the intermediate value, such that it has a pyramid shape.

Further, it is preferable that the multi-layered ceramic capacitor according to the exemplary embodiment of the present invention meets the following Equation 2.

$$|Ln-Ln+1|=d \text{ is constant (except in the case of } LN=LN+1\text{)} \qquad \text{Equation 2}$$

It is preferable that the difference between the lengths of the adjacent internal electrodes is constant in the internal electrode group.

In addition, it is preferable that the lengths of the internal electrodes existing at the outside are symmetrical to each other based on the internal electrodes of the center. In other words, it is preferable that the internal electrodes of the internal electrode group having M (2N or 2N+1) internal electrodes meet the following Equation 3.

$$L1=LM, L2=LM-1, L3=LM-2 \qquad \text{Equation 3}$$

As a result, the internal electrodes in the internal electrode group may be disposed at the same interval and may be disposed to have an opposing area equal to that of the internal electrode of the adjacent internal electrode group.

In other words, when M opposing area is provided between the mutually facing internal electrodes of the mutually opposing internal electrode groups, it is preferable that the opposing area is not 0 if an m-th opposing area is $S_m$.

$$S_m \neq 0$$

The internal electrode in which the opposing area is 0 does not form capacitance, such that a current flowing path is not present. As a result, the internal electrode does not contribute to an ESR reducing effect. In addition, it is preferable to meet the following Equation 4.

$$S_1=\ldots=S_m=\ldots=S_M \qquad \text{Equation 4}$$

That is, it is preferable that each opposing area is equal. In more detail, when each capacitance formed by an opposing area $S_M$, owned by the internal electrodes in the internal electrode group, is equal, current flow is uniformly divided, thereby increasing the ESR reducing effect.

Referring to FIG. 1, a first internal electrode group 200 electrically connected to the first external electrode 20 includes three internal electrodes 201, 202, and 203. The length L1 of the first internal electrode 201 and the length L3 of the third internal electrode 203 are the same. The length L2 of the second internal electrode 202 meets the following Equation.

$$L1<L2>L3$$

That is, the length of the second internal electrode 202 is longest, the lengths of the first and third internal electrodes 201 and 203 are equal, but shorter than the length of the second internal electrode 202. In addition, the difference between the lengths of the first and third internal electrodes 201 and 203 adjacent to the length of the second internal electrode 202 is equal to d.

Similarly, a second internal electrode group 300 electrically connected to the second external electrode 30 includes three internal electrodes 301, 302, and 303. The length L2 of the first internal electrode 302 is longest and the lengths L1 and L3 of the first and third internal electrodes 301 and 303 are equal, but shorter than the length L2 of the second internal electrode 302. In addition, the difference d between the lengths of the first and third internal electrodes 302 and 301 adjacent to the length of the second internal electrode 302 is equal. That is, it meets the following Equation.

$$|L1-L2|=|L2-L3|=d$$

Meanwhile, the first internal electrode group 200 and the second internal electrode group 300 have areas opposing each other. The second and third internal electrodes 202 and 203 of the first internal electrode group 200 have opposing areas by being disposed to face the first and second internal electrodes 301 and 302 of the second internal electrode group 300.

Referring to FIG. 1, the third internal electrode 203 of the first internal electrode group and the second internal electrode 302 of the second internal electrode group have an opposing area $S_1$ by being disposed to face each other. The second internal electrode 202 of the first internal electrode group has opposing areas $S_2$ and $S_3$ by being disposed to face the first and second internal electrodes of the second internal electrode group, respectively.

Further, according to the exemplary embodiment of the present invention, the opposing areas $S_1$, $S_2$, and $S_3$ meet the following Equation.

$$S_1=S_2=S_3$$

That is, the opposing areas $S_1$, $S_2$, and $S_3$ are the same as each other. Each opposing area serves as an individual capacitor. Strictly speaking, when each capacitance formed by the opposing areas $S_1$, $S_2$, and $S_3$ having the internal electrodes in the internal electrode group is the same, the current flow is uniformly divided, thereby increasing the ESR reducing effect.

Figure 2:
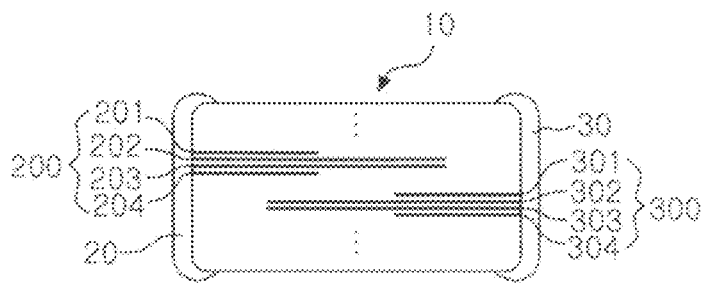
FIGS. 2 to 4 are cross-sectional views of a multi-layered ceramic capacitor according another exemplary embodiment of the present invention.
Figure 3:
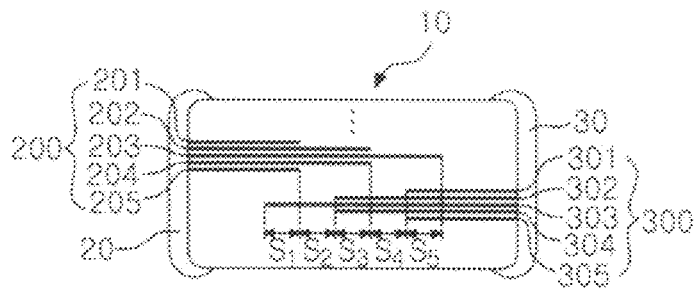
Figure 4:
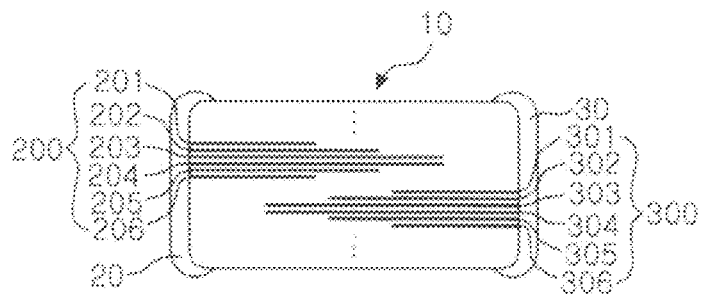

FIGS. 2 to 4 are cross-sectional views of a multi-layered ceramic capacitor according another exemplary embodiment of the present invention.

FIG. 2 is a cross-sectional view of a multi-layered capacitor formed to include internal electrode groups having 4 (N=4) internal electrodes as another exemplary embodiment.

Referring to FIG. 2, the first internal electrode group 200 electrically connected to the first external electrode 20 includes four internal electrodes 201, 202, 203, and 204. The length L1 of the first internal electrode 201 and the length L4 of the fourth internal electrode 204 are equal to each other. The length L2 of the second internal electrode 202 and the length L3 of the third internal electrode 203 are equal to each other. The four internal electrodes 201, 202, 203, and 204 meet the following Equation.

$$L1<L2=L3>L4$$

That is, the lengths of the second internal electrode 202 and the third internal electrode 203 in the middle are longest and the lengths of the first and fourth internal electrodes 201 and 204 are equal to each other but shorter than those of the second internal electrode 202 and the third internal electrode 203. In addition, the difference between the length of the first internal electrode 201 and the length of the adjacent second internal electrode 202 and the difference between the length of the third internal electrode 203 and the length of the adjacent fourth internal electrode 204 is the same as d, but in this case, the internal electrode exists as an even number, such that the lengths of the second and third internal electrodes 202 and 203 existing at the center are the same.

$$|L1-L2|=|L3-L4|=d \text{ (except for } L2 \text{ and } L3\text{)}$$

Similarly, a second internal electrode group 300 electrically connected to the second external electrode 30 includes four internal electrodes 301, 302, 303, and 304. The lengths L2 and L3 of the second and third internal electrodes 302 and 303 are longest and the lengths L1 and L4 of the first and fourth internal electrodes 301 and 304 are equal, but shorter than the lengths L2 and L3 of the second and third internal electrodes 302 and 303. In addition, the difference between the length of the first internal electrode 301 and the length of the adjacent second internal electrode 302 and the difference between the length of the third internal electrode 303 and the length of the adjacent fourth internal electrode 304 is equal to d, but the lengths of the second and third internal electrodes 202 and 203 existing at the center are equal.

FIG. 3 is a cross-sectional view of a multi-layered capacitor formed to have internal electrode groups having 5 (N=5) internal electrodes as another exemplary embodiment.

Referring to FIG. 3, the first internal electrode group 200 electrically connected to the first external electrode 20 includes five internal electrodes 201, 202, 203, 204, and 205. The length of the third internal electrode 203 is longest and the length L1 of the first internal electrode 201 and the length L5 of the fifth internal electrode 205 are equal. The length L2 of the second internal electrode 202 and the length L4 of the fourth internal electrode 204 are equal. The five internal electrodes 201, 202, 203, 204, and 205 meet the following Equation.

$$L1<L2<L3>L4>L5$$

The lengths L1, L2, L3, L4, and L5 of five internal electrodes 201, 202, 203, 204, and 205 meet the following Equation.

$$|L1-L2|=|L2-L3|=|L3-L4|=|L4-L5|=d$$

That is, the difference between the lengths of the adjacent internal electrodes is equal and it has a pyramid shape in which the length is longer towards to the middle and shorter towards both sides.

Meanwhile, referring to FIG. 3, the first internal electrode group 200 and the second internal electrode group 300 have the opposing areas to each other. The third, fourth, and fifth internal electrodes 203, 204, and 205 of the first internal electrode group 200 have an opposing area by being disposed to face the first, second, and third internal electrodes 301, 302, and 303 of the second internal electrode group 300.

The fifth internal electrode 205 of the first internal electrode group and the third internal electrode 303 of the second internal electrode group have an opposing area $S_1$ by being disposed to face each other. The second internal electrode 204 of the first internal electrode group has opposing areas $S_2$ and $S_3$ by being disposed to face the second and third internal electrodes 302 and 303 of the second internal electrode group, respectively. The third internal electrode 203 of the first internal electrode group has opposing areas $S_4$ and $S_5$ by being disposed to face the first and second internal electrodes 301 and 302 of the second internal electrode group, respectively.

It is preferable that each opposing area $S_1$, $S_2$, $S_2$, $S_4$, and $S_5$ meet the following Equation.

$$S_1=S_2=S_3=S_4=S_5$$

FIG. 4 is a cross-sectional view of a multi-layered capacitor formed to include internal electrode groups having 6 (N=6) internal electrodes as another exemplary embodiment.

Referring to FIG. 4, the first internal electrode group 200 electrically connected to the first external electrode 20 includes six internal electrodes 201, 202, 203, 204, 205, and 206. The six internal electrodes 201, 202, 203, 204, 205, and 206 meet the following Equation.

$$L1<L2<L3=L4>L5>L6$$

The lengths L1, L2, L3, L4, L5, and L6 of each of the six internal electrodes 201, 202, 203, 204, 205, and 206 meet the following Equation.

$$|L1-L2|=|L2-L3|=|L4-L5|=|L5-L6|=d \text{ (However, except for } L3 \text{ and } L4\text{)}$$

In the case of an even number of internal electrodes, the lengths of the third and fourth electrodes, corresponding to the center, are equal and the difference between the lengths of the remaining adjacent internal electrodes are equal.

Figure 5:
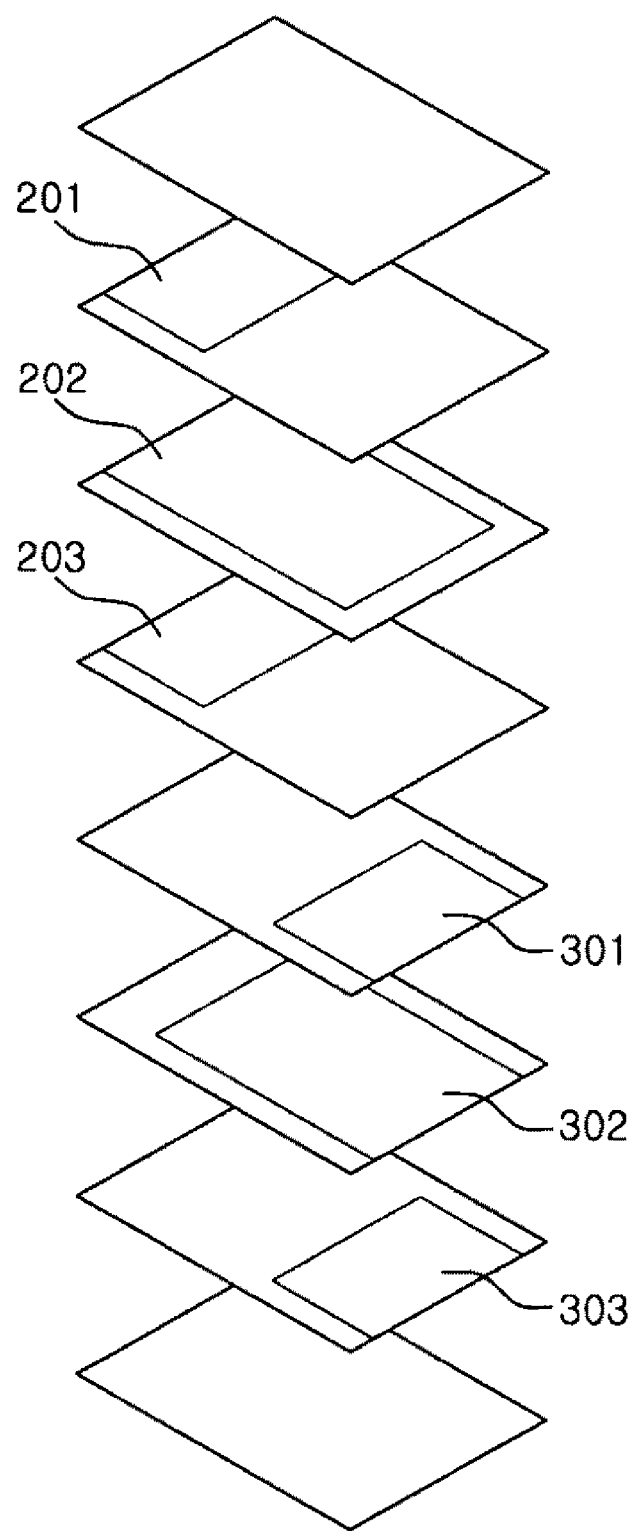
FIG. 5 is an exploded perspective view of the multi-layered ceramic capacitor of FIG. 1 according to an exemplary embodiment of the present invention.

FIG. 5 is an exploded perspective view of the multi-layered ceramic capacitor of FIG. 1.

As shown in FIG. 5, in the multi-layered capacitor array, the internal electrodes 201, 202, 203, 301, 302, and 303 are formed in each of the plurality of dielectric layers. The first and final electrodes are formed with the dielectric layer serving as the cover and the first, second, and third internal electrodes 201, 202, and 203 corresponding to the first internal electrode group 200 and the first, second, and third internal electrodes 301, 302, and 303 corresponding to the second internal electrode group 300 are formed therebetween.

Each internal electrode may have an equal width and the lengths L1, L2, and L3 of the first, second, and third internal electrodes meet the following Equation as described above.

$$L1<L2>L3$$

FIG. 5 is an exploded perspective view of the multi-layered ceramic capacitor of FIG. 1.

As shown in FIG. 5, in the multi-layered capacitor array, the internal electrodes 201, 202, 203, 301, 302, and 303 are formed in each of the plurality of dielectric layers. The first and final electrodes are formed with the dielectric layer serving as the cover and the first, second, and third internal electrodes 201, 202, and 203 corresponding to the first internal electrode group 200 and the first, second, and third internal electrodes 301, 302, and 303 corresponding to the second internal electrode group 300 are formed therebetween.

Each internal electrode may have an equal width and the lengths L1, L2, and L3 of the first, second, and third internal electrodes meet the following Equation as described above.

$$L1<L2>L3$$

Figure 6:
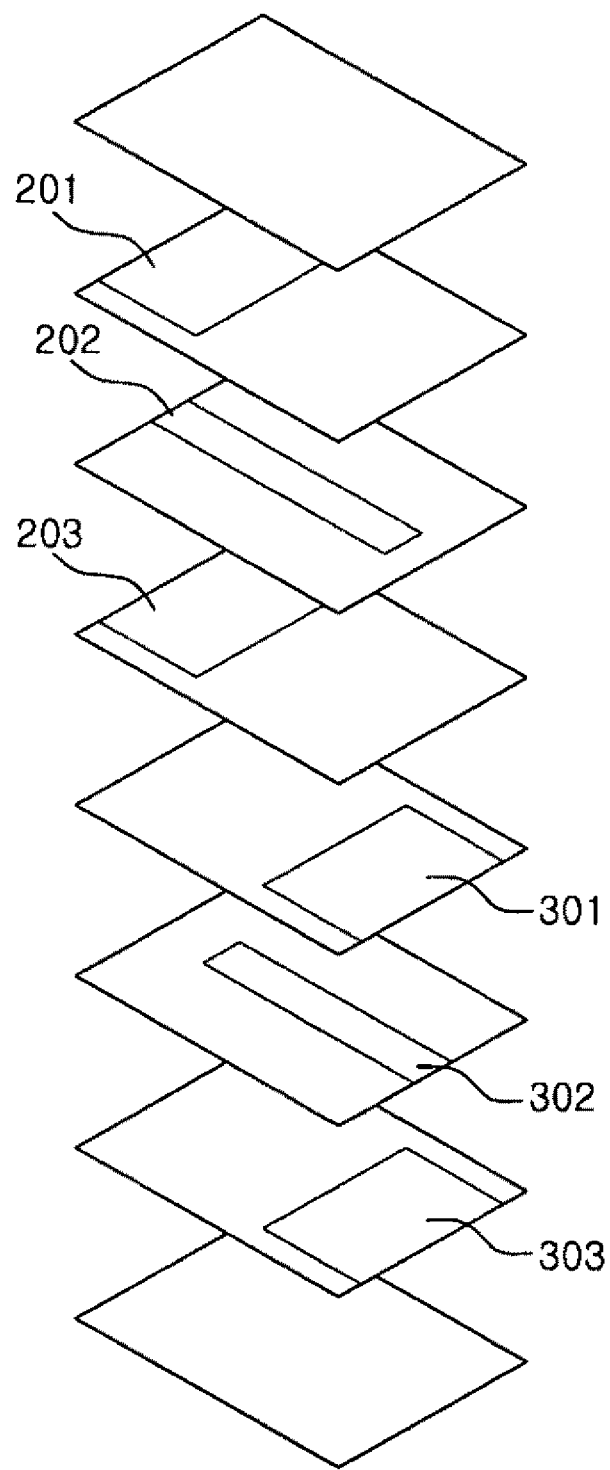
FIG. 6 is an exploded perspective view of the multi-layered ceramic capacitor of FIG. 1 according to another exemplary embodiment of the present invention.

FIG. 6 is an exploded perspective view of the multi-layered ceramic capacitor of FIG. 1 according to another exemplary embodiment of the present invention.

Referring to FIG. 6, in the multi-layered capacitor array, the internal electrodes 201, 202, 203, 301, 302, and 303 are formed in each of the plurality of dielectric layers as described above and may meet the above-mentioned length conditions.

However, in the case of another exemplary embodiment of the present invention, each internal electrode may have different widths. When the plurality of internal electrodes are formed in the internal electrode group, they may be disposed to face the other internal electrodes in the same internal electrode group even though the widths of the internal electrode are reduced. Therefore, in the case of the present invention, the internal electrode may have different widths.

Figure 7:
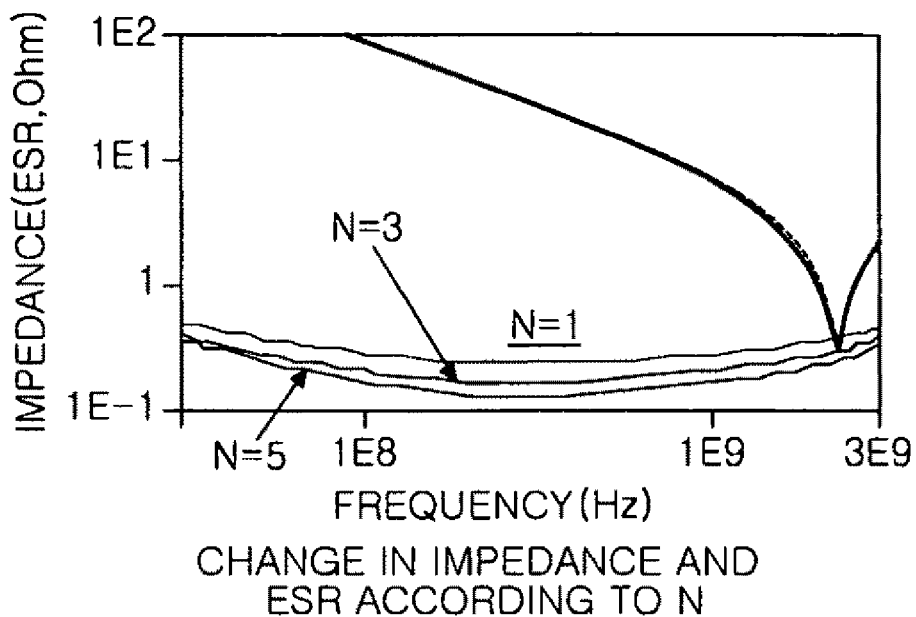
FIGS. 7 and 8 are graphs showing impedance and an ESR value according to N value.
Figure 8:
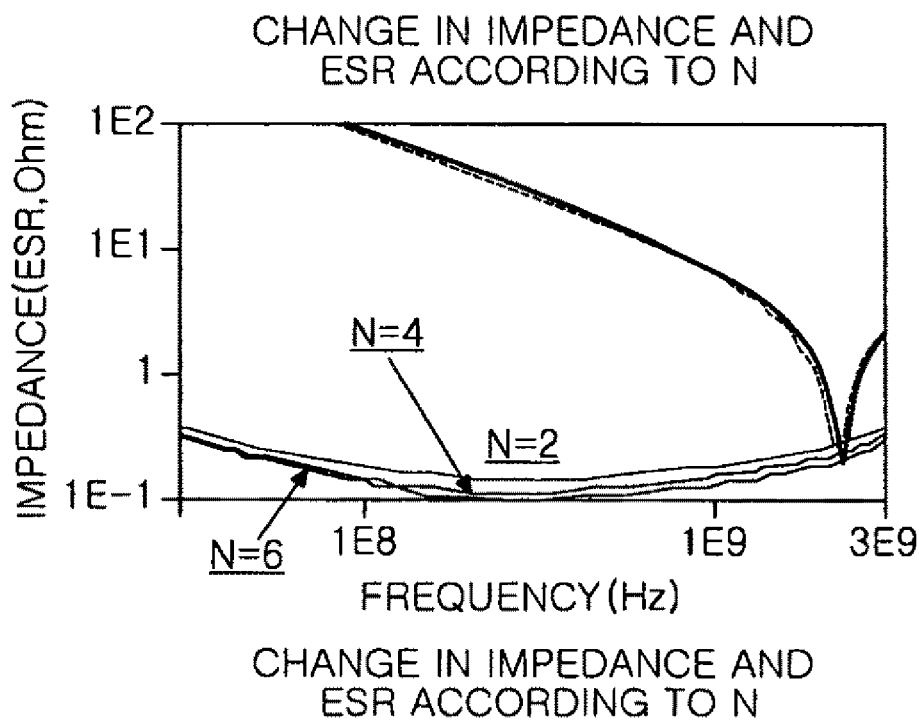

FIGS. 7 and 8 are graphs showing impedance and an ESR value according to N value.

It can be appreciated from FIGS. 7 and 8 that the ESR value is reduced as the N value is increased. This is configured to allow the internal electrode of the multi-layered ceramic capacitor to form the internal electrode group and forms the facing internal electrode group and the capacitance, thereby making it possible to disperse the current flowing to reduce the ESR value. Therefore, the present invention controls the N value, thereby making it possible to control the ESR value.

As set forth above, according to the multi-layered ceramic capacitor of the present invention, the internal electrode groups are alternately disposed and each of the internal electrodes of the internal electrode groups forms the facing internal electrode groups and the capacitance to increase the current flowing path, thereby making it possible to lower internal resistance. That is, the number of current flow paths is changed according to the number of internal electrodes of the internal electrode groups, thereby making it possible to control the ESR.

While the present invention has been shown and described in connection with the exemplary embodiments, it will be apparent to those skilled in the art that modifications and variations can be made without departing from the spirit and scope of the invention as defined by the appended claims.

What is claimed is:

1. A multi-layered ceramic capacitor, comprising:
a sintered ceramic body part in which cover layers are provided on both surfaces thereof as an outermost layer and a plurality of ceramic layers are stacked therebetween;
first and second external electrodes each formed on an outer surface of the sintered ceramic body part;
a plurality of first and second internal electrode groups adjacent to each other in a stacking direction of the plurality of ceramic layers, having the ceramic layer therebetween, and including 2N or 2N+1 (N is an integer number larger than 1) internal electrodes electrically connected to the first and second external electrodes,
wherein in the same internal electrode group, the internal electrodes in the outside direction have a length shorter than the adjacent internal electrodes in the central direction,
wherein when M opposing areas are provided between the mutually overlapping internal electrodes of the mutually facing internal electrode groups, the following equation is met if an m-th ($1 \leq m \leq M$) overlapping area is $S_m$:

$$S_1 = \ldots = S_m = \ldots = S_M.$$

2. The multi-layered ceramic capacitor of claim 1, wherein the 2N or 2N+1 (N is an integer number larger than 1) internal electrodes are disposed to overlap at least one internal electrode of other adjacent internal electrode groups, and when a length of an n-th internal electrode is $L_n$ in the internal electrode, the following equation is met:

$$L_1 < L_2 < \ldots < L_N = L_{N+1} > L_{N+2} > \ldots > L_{2N} \text{ (a case of } 2N\text{)}$$

$$L_1 < L_2 < \ldots < L_{N+1} > L_{N+2} > \ldots > L_{2N+1} \text{ (a case of } 2N+1\text{)}.$$

3. The multi-layered ceramic capacitor of claim 1, wherein when a length of an n-th internal electrode is $L_n$ in the internal electrode, the following equation is met:

$$|L_n - L_{n+1}| = d \text{ is constant (however, except in the case of } L_N = L_{N+1}).$$

4. The multi-layered ceramic capacitor of claim 1, wherein the internal electrodes of the internal electrode group having M (2N or 2N+1) internal electrodes meet the following equation:

$$L_1 = L_M, L_2 = L_{M-1}, L_3 = L_{M-2}.$$

5. The multi-layered ceramic capacitor of claim 1, wherein when M opposing areas are provided between the mutually overlapping internal electrodes of the mutually facing internal electrode groups, the following $S_m$ is not 0 if an m-th ($1 \leq m \leq M$) overlapping area is $S_m$.

6. The multi-layered ceramic capacitor of claim 1, wherein the widths of the internal electrodes in the internal electrode group are different from each other.

7. The multi-layered ceramic capacitor of claim 1, wherein an ESR value is controlled by controlling the N value.

* * * * *